April 25, 1967     F. S. SIEVE     3,315,525
MEDICAL THERMOMETER AND CASING THEREFOR
Filed Oct. 15, 1965     2 Sheets-Sheet 1
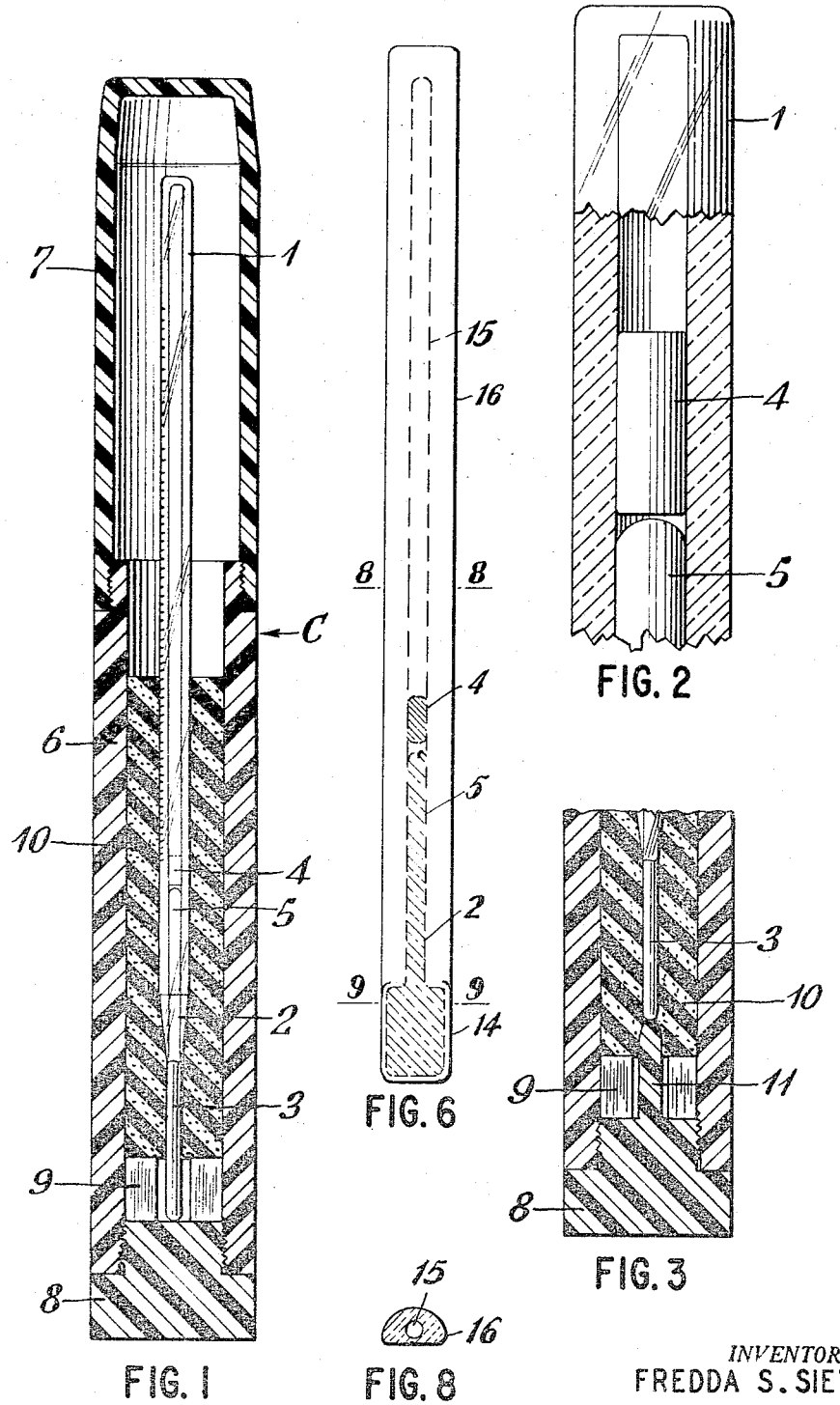
INVENTOR.
FREDDA S. SIEVE
BY
*Nina M. Lawrence*
ATTORNEY April 25, 1967  F. S. SIEVE  3,315,525
MEDICAL THERMOMETER AND CASING THEREFOR
Filed Oct. 15, 1965  2 Sheets-Sheet 2
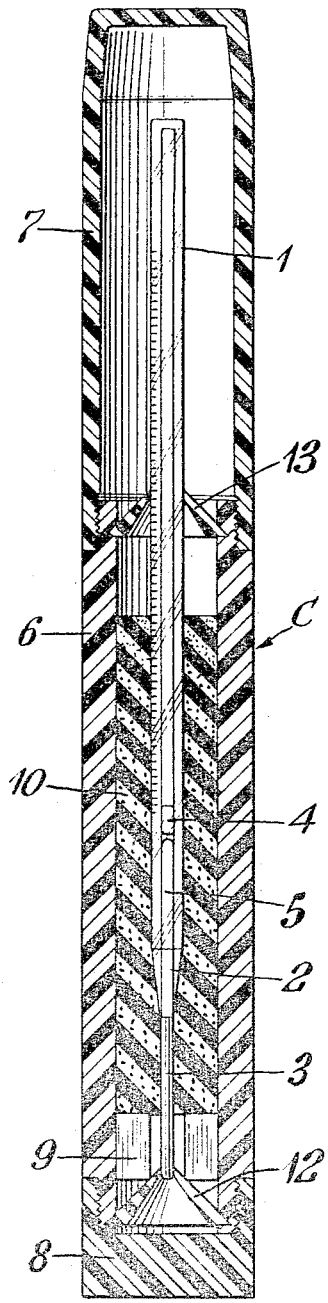
FIG. 4
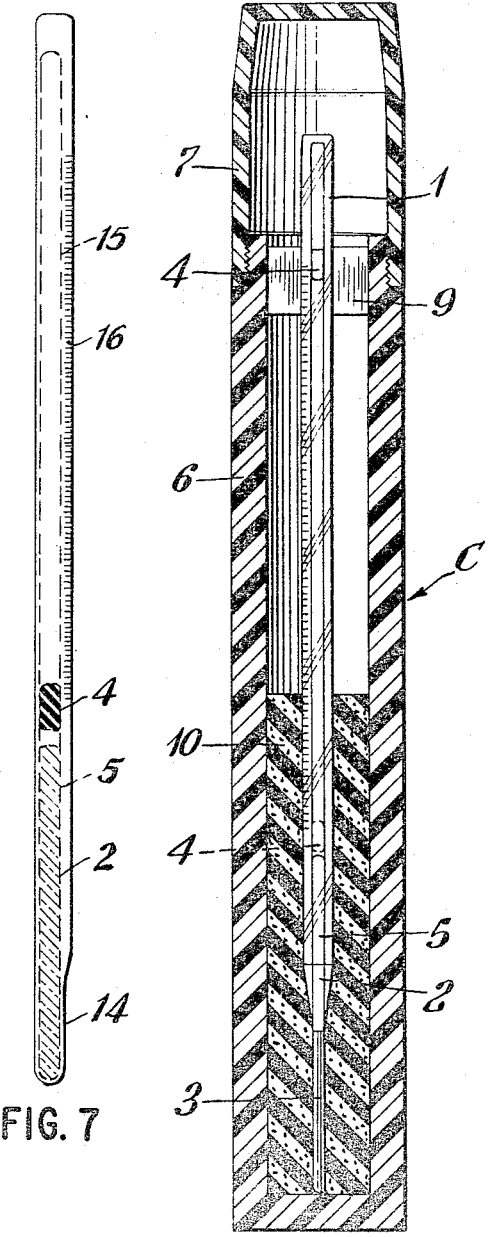
FIG. 7
FIG. 5
FIG. 9
INVENTOR
FREDDA S. SIEVE
BY
ATTORNEY United States Patent Office 3,315,525
Patented Apr. 25, 1967

3,315,525
MEDICAL THERMOMETER AND CASING
THEREFOR
Fredda S. Sieve, 4 E. 70th St.,
New York, N.Y. 10021
Filed Oct. 15, 1965, Ser. No. 505,106
24 Claims. (Cl. 73—374)

The present application is a continuation-in-part of copending United States application bearing Ser. No. 392,067 filed Aug. 3, 1964, now abandoned, and entitled, "Medical Thermometer and Casing Therefor." The latter application, bearing U.S. Ser. No. 392,067, was a continuation-in-part of and was filed during the pendency of United States application Ser. No. 215,349 filed Aug. 7, 1962, now abandoned, entitled, "Medical Thermometer and Casing Therefor."

The present invention relates to medical thermometers and more particularly to a medical thermometer provided with a device permitting easy reading of the temperature and easy return of the thermometer liquid to its minimum position in the capillary bore. The present invention also relates to sterilizing means whereby the thermometer is constantly and automatically sterilized throughout its whole length and area and is, therefore, ready for instant use.

Several difficulties are commonly experienced in connection with the use of medical thermometers. The temperature is not easy to read. The liquid (mercury) must be restored to its original or minimum position in the capillary before another reading is taken; this is usually done by whipping or rotating the instrument by hand to bring centifugal action or inertia into play. However, relatively great strength and some skill is necessary for such an operation, which is also time-consuming. Numerous devices have been proposed to eliminate this manual shake-down step, some by the use of air or gas pressure methods, others by the use of various springs cooperating with arm members attached to the casing. Another difficulty resides in the necessity of sterilizing the thermometer before each use. Antiseptic holders and containers have also been proposed, in which a felt material, or the like, impregnated with liquid antiseptic, is disposed around the thermometer in the holder or casing thereof. However, the main disadvantage of all these devices is that they are somewhat complicated. Another disadvantage is the increase in the bulk and volume of the thermometer and/or of the casing.

It is an object of my invention to provide an improved and new thermometer of simple structure in which the liquid level is indicated by a slug positioned in the capillary above the thermometer liquid.

It is another object of my invention to provide means for returning the thermometer slug indicator to its minimum position without having to shake the thermometer down, either by hand or by use of springs, and which also eliminates the air or gas pressure methods of the prior art. This object is attained by the elimination of the usual constriction to permit maximum reading and by use of a magnet to pull the slug indicator down to the minimum position.

A further object of my invention is to permit the automatic sterilization of the thermometer by the presence, in the container, of a vinyl sponge, or other sponge material, impregnated with the sterilizing liquid. The thermometer is thus always ready for use.

Still another object of my invention is to provide a medical thermometer and casing therefor, the thermometer-casing assembly being small and compact and simple to manufacture.

It is also an object of the present invention to provide means for increasing the rate of heat flow into the thermometer bulb. This object is achieved by providing the thermometer with a spatula-shaped bulb instead of the conventional cylindrical one used heretofore.

These and other objects of my invention will be best understood in the following description. Th accompanying drawings are only illustrative of the present invention and not limitative thereof.

FIGURE 1 is a longitudinal sectional view of the thermometer in a first embodiment of the casing;

FIGURE 2 is an enlarged section of the upper part of the thermometer showing the slug positioned in the capillary above the thermometer liquid;

FIGURE 3 is a sectional view of a modification of one end of the casing of FIGURE 1;

FIGURE 4 is a longitudinal sectional view of the thermometer in the casing of FIGURE 1 with another modification of said casing;

FIGURE 5 is a longitudinal sectional view of the thermometer in a second embodiment of the casing;

FIGURE 6 is a frontal longitudinal sectional view of a thermometer of novel shape, which I have invented;

FIGURE 7 is a longitudinal sectional side view of the thermometer shown in FIGURE 6;

FIGURE 8 is a cross-sectional view taken along the lines 8—8 of FIGURE 6; and

FIGURE 9 is a cross-sectional view taken along the lines 9—9 of FIGURE 6.

As shown in FIGURE 1, the thermometer of my invention comprises an ordinary medical thermometer 1 with the exception that there is no constriction in the bore 2 above the bulb 3 to cut off a portion of the mercury column to form a maximum reading. Instead, a small magnetic slug 4 of cylindrical shape is disposed above the mercury 5 in the bore and fits in close contact and sliding engagement with the walls defining the bore.

The thermometer is used with a casing $c$ which comprises a hollow cylinder 6 provided at each end thereof with a cap, 7 and 8, such as a screw or pressure cap or other known type of closure. One end portion of the cylinder 6 is provided with one or more small magnets 9 secured to the inner wall of such end-portion. The magnet or magnets 9 are so shaped that they leave a passage in the center of the cylinder 6 for the thermometer. By inserting the top end of the thermometer into the magnet end portion of the cylinder and pushing such thermometer completely into the cylinder 6, the slug 4 is drawn down by the magnet into minimum position in contact with the mercury 5. Thus, the thermometer is set without any effort and without the need of any shankedown movement. When the thermometer is removed from the casing through the other end portion thereof, the slug remains in the minimum position. Upon taking the temperature, as shown in FIGURE 2, the mercury column rises in the usual manner, pushing the slug up to the maximum position. After taking the temperature the mercury column goes down since there is no constriction in the bore, while the slug 4 remains in the maximum position, permitting an easy reading until the thermometer is again inserted into the cylinder through the magnet end thereof.

The magnet may be made of cobalt alloy. However, in view of the high cost of cobalt, a one percent chromium high carbon steel or any low alloy high carbon steel magnet might be preferred.

In view of its high permeability, relatively pure, low carbon content iron is a preferred material for the slug 4 such as "Armco" ingot iron wire, for example. Or, because of the very small size of the slug, a substantially pure powdered iron sintered article, with or without subsequent drawing or swaging, would be more economical and quite suitable in the thermometer of the present invention. To make reading easier, the slug 4 may be colored, such as black, or red, for example, or may contain phosphorescent material.

Above the magnet 9, the inside wall of the cylinder 6 is provided with a thick layer 10 of natural or synthetic sponge material defining a narrow central passage for the thermometer along the longitudinal axis of the casing. The sponge material is impregnated with any desired sterilizing liquid and is preferably made of a hydrocarbon elastomer such as vinyl foam rubber, for example, in view of the low cost of this material. The sponge is compressed by the thermometer when it is pushed up through the narrow central passage in the casing, whereby liquid is released from the sponge to bathe and sterilize the thermometer. The thermometer may be kept and stored in this position and is ready for use when pulled out of the sponge 10 and of the casing. It should be well understood that the thermometer is introduced into the casing through the magnet end thereof and is pulled out through the other end in this embodiment.

If desired, as shown in FIGURE 3, the cap 8 may be provided, in the center of the inside wall thereof, with a protuberance or stem 11, in alignment with the central passage in the casing and extending into such passage as far as the sponge. Upon securing the cap 8 on the cylinder 6, the stem 11 pushes the bulb 3 past the magnet 9 in the sponge 10.

In a further modification of the present invention, illustrated in FIGURE 4, the lower end of the cylinder 6 is provided with a hollow cone 12 of a moderate elastomer material such as natural or synthetic rubber, or polyurethane, for example. The base of the cone 12 is secured to the inside wall of the cylinder 6 near the extremity thereof and the apex of said cone 12 extends into the cylinder in the direction of the central passage provided in the magnet 9. The point of the cone is open slightly, or slit, to permit passage of the thermometer when the top end of the thermometer is inserted, through the base of the cone and the hollow interior thereof into the magnet end portion of the cylinder and thereafter pushed completely into the cylinder. A similar cone 13 is placed at the upper end of the cylinder 6 with its base being secured to the inside wall thereof while its apertured apex extends in the direction of the upper extremity of the cylinder.

The thermometer can be pushed through the cones from the hollow inside part thereof, but not from the other side or apex side. This arrangement makes it impossible to insert the thermometer into the casing from the wrong end. Also, in this modification, the lower closure cap 8 of the casing c may be eliminated, the hollow cone 12 forming the bottom closure of the cylinder and, thus, of the casing.

FIGURE 5 illustrates another embodiment of my invention wherein like reference numerals designate like parts. In this embodiment, casing c is open only at its upper end. The magnet or magnets 9 are secured to the upper end portion of the inner wall of the hollow cylinder 6. The upper end of the cylinder is provided with a removable cap 7 similar to that shown in FIGURES 1 and 4. When the thermometer is inserted into the casing through the upper end thereof in normal manner with the bulb end first, the slug 4 in the bore 2 is drawn up by the magnet 9 away from the mercury and remains in the upper part of the bore, within the field of attraction of the magnet, as long as the thermometer remains in the casing. When the thermometer is pulled out of the casing, the slug 4 is drawn down by the magnet into minimum position in contact with the mercury 5 as shown in dotted lines.

FIGURES 6 to 9 illustrate a thermometer of novel shape which can be used to advantage in my invention, with the various casings indicated in the drawings and/or set forth herein. One of the aims of a fast acting clinical thermometer is to obtain the most rapid rate of heat flow into the bulb while maintaining a bulb of practicable size. As illustrated in FIGURES 6 to 9, I have achieved this by providing a thermometer with a spatula-shaped bulb 14. For protective purposes, it is advisable to have the stem portion 15 of the thermometer encased in a sheath 16 and that there be a minimum of discontinuity between the spatula-shaped bulb 14 and the stem 15. If desired, the whole thermometer, including the sheath 16, could be made of glass, or, if desired, the bulb and stem could be made of glass and the sheath of plastic. As shown in FIGURE 8, the sheath 16 can be of semi-cylindrical shape. It is also possible to have only that portion of the surface of the sheath, which is to be used for reading the graduations on the thermometer, curved for magnifying purposes.

Other modifications may be effected, which are all within the scope of the present invention. For example, the sponge may not be present in the casing. A plurality of small magnets may be disposed around the periphery of the inner wall of the cylinder defining a passage for the thermometer.

The casing c may be made of a plastic resin, such as Bakelite, for example, or of fiber board, or of any material known for that purpose. The only requirement is that such material should be inert with respect to the magnet and to the disinfectant.

Although I have described my invention with a certain degree of particularity, it is understood that the present disclosure has been made only by way of example, and that numerous changes in the details of construction and the combination and arrangement of parts may be resorted to without departing from the spirit and scope of the invention as hereinafter claimed.

What is claimed is:

1. The combination of a medical thermometer and casing therefor, said thermometer comprising a tube having an upper portion and a lower portion, a liquid column in said tube and a magnetic slug disposed within said tube above the liquid column in close contact and sliding engagement with said tube, and said casing comprising a hollow cylinder adapted to receive said thermometer, a cap at each end of said cylinder for closing said cylinder, and a magnet secured within said cylinder at one end thereof, whereby the magnetic slug is drawn down to minimum position by inserting the upper portion of said thermometer into the magnet end portion of the cylinder and pushing said thermometer completely into said cylinder.

2. The combination of claim 1, in which a plurality of magnets are secured within the cylinder at one end thereof and said magnets define a central passage for the thermometer.

3. The combination of claim 1, in which the magnet is made of a material selected from the group consisting of a cobalt alloy, high carbon steel and low alloy high carbon steel.

4. The combination of claim 1, in which the slug is made of a material selected from the group consisting of low carbon content iron and sintered substantially pure powdered iron.

5. The combination of claim 1, in which a hollow cone of an elastomer material is secured within the cylinder at each extremity thereof, the first cone being disposed at the magnet end portion of the cylinder below said magnet with its apex extending into the cylinder in the direction of the magnet, and the second cone being disposed at the opposite end portion of the cylinder with its apex extending away from the magnet, the apex of each cone being provided with an opening for passage of the thermometer therethrough from the hollow interior of said cone when said thermometer is inserted into said cylinder.

6. The combination of a medical thermometer and casing therefor, said thermometer comprising a tube having an upper portion and a lower portion, a liquid column in said tube and a magnetic slug disposed within said tube above the liquid column in close contact and sliding engagement with said tube, and said casing comprising a hollow cylinder adapted to receive said thermometer, a magnet secured within said cylinder at one end thereof, a hollow cone of an elastomer material secured within the cylinder at each extremity thereof, the first cone being disposed at the magnet end portion of the cylinder below said magnet with its apex extending into the cylinder in the direction of the magnet, and the second cone being disposed at the opposite end portion of the cylinder with its apex extending away from the magnet, and a cap for closing said cylinder at said opposite end portion thereof, the apex of each cone being provided with an opening for passage of the thermometer therethrough, whereby the magnetic slug is drawn down to minimum position by inserting the upper portion of said thermometer into the magnet end portion of the cylinder through the first cone from the hollow interior thereof and pushing said thermometer into said cylinder, and said magnet end portion is closed by said first cone after passage of the thermometer therethrough while said second cone securely holds said upper portion of said thermometer passing therethrough from the hollow interior thereof.

7. The combination of a medical thermometer and casing therefor, said thermometer comprising a cylindrical tube having an upper portion and a lower portion, a liquid mercury column in said tube, and a cylindrical magnetic slug disposed within said tube above the liquid column in close contact and sliding engagement with said tube, and said casing comprising a hollow cylinder adapted to receive said thermometer, a cap at each end of said cylinder for closing said cylinder, a magnet secured within said cylinder at one end thereof, and a thick lining of sponge material impregnated with a sterilizing liquid within said cylinder above said magnet, said sponge material defining a narrow central passage for the thermometer, whereby the magnetic slug is drawn down to minimum position and the sterilizing liquid is released from the sponge material to bathe the thermometer by inserting the upper portion of said thermometer into the magnet end portion of the cylinder and pushing said thermometer completely into said cylinder.

8. The combination of claim 7, in which the sponge material is made of a hydrocarbon elastomer material.

9. The combination of claim 7, in which a hollow cone of a hydrocarbon elastomer material is secured within the cylinder at each extremity thereof, the first cone being disposed at the magnet end portion of the cylinder below said magnet with its apex extending into the cylinder in the direction of the magnet, and the second cone being disposed at the opposite end portion of the cylinder with its apex extending away from the magnet, the apex of each cone being provided with an opening for passage of the thermometer therethrough from the hollow interior of said cone when said thermometer is inserted into said cylinder.

10. The combination of claim 7, in which the cap at the magnet end portion of the cylinder has a protuberance in alignment with the central passage of the cylinder, whereby upon fixing said cap on the cylinder, said protuberance pushes the lower portion of the thermometer past the magnet into the sponge material.

11. The combination of claim 7, in which a plurality of magnets are secured within the cylinder at one end thereof and said magnets define a central passage for the thermometer.

12. The combination of claim 7, in which the magnet is made of a material selected from the group consisting of a cobalt alloy, high carbon steel, and low alloy high carbon steel.

13. The combination of claim 7, in which the slug is made of a material selected from the group consisting of low carbon content iron and substantially pure sintered powdered iron.

14. The combination of claim 7, in which the slug is colored.

15. The combination of claim 7, in which the slug contains a phosphorescent material.

16. The combination of a medical thermometer and casing therefor, said thermometer comprising a tube having an upper portion and a lower portion, a liquid column in said tube and a magnetic slug disposed within said tube above the liquid column in close contact and sliding engagement with said tube, and said casing comprising a hollow cylinder permanently closed at one extremity thereof and adapted to receive said thermometer, a cap at the open end of the cylinder for closing said cylinder, and a magnet secured within said cylinder near the open end thereof, whereby the magnetic slug is drawn up to the upper portion of the tube by inserting the lower portion of said thermometer into the magnet end portion of the cylinder and pushing said thermometer into said cylinder, and said magnetic slug is thereafter drawn down to minimum position by pulling the thermometer out of the cylinder.

17. The combination of a medical thermometer and casing therefor, said thermometer comprising a cylindrical tube having an upper portion and a lower portion, a liquid mercury column in said tube, and a cylindrical magnetic slug disposed within said tube above the liquid column in close contact and sliding engagement with said tube, and said casing comprising a hollow cylinder permanently closed at one extremity thereof and adapted to receive said thermometer, a cap at the open end of the cylinder for closing said cylinder, a magnet secured within said cylinder at the open end thereof, and a thick lining of sponge material impregnated with a sterilizing liquid within said cylinder below said magnet, said sponge material defining a narrow central passage for the thermometer, whereby the magnetic slug is drawn up to the upper portion of the tube and the sterilizing liquid is released from the sponge material to bathe the thermometer by inserting the lower portion of said thermometer into the magnet end portion of the cylinder and pushing said thermometer completely into said cylinder, and said magnetic slug is thereafter drawn down to minimum position by pulling the thermometer out of said cylinder.

18. The combination of a medical thermometer and casing therefor, said thermometer comprising a tube having an upper stem portion and a lower spatula-shaped bulb portion, a liquid column in said tube and a magnetic slug disposed within said tube above the liquid column in close contact and sliding engagement with said tube; and said casing comprising a hollow elongated receptacle adapted to receive said thermometer, and a magnet secured within said casing at one end thereof, said magnet being adapted to draw the magnetic slug down to minimum position.

19. The combination of claim 18, in which said upper stem portion has an outer sheath extending upwards along its length from said spatula-shaped bulb portion and said sheath has at least a portion of its outer surface curved.

20. The combination of claim 18, in which a plurality of magnets are secured within the casing at one end thereof and said magnets define a central passage for the thermometer.

21. The combination of claim 18, in which said casing is provided with a thick inner lining of sponge material impregnated with a sterilizing liquid above said magnet, said sponge material defining a narrow central passage for the thermometer.

22. The combination of claim 21, in which said casing has a cap at each end for closing said casing and the cap at the magnet end portion of the casing has a protuberance in alignment with the central passage of the casing, whereby upon fixing said cap on the casing, said protuberance pushes the lower portion of the thermometer past the magnet into the sponge material.

23. The combination of claim 18, in which a hollow cone of an elastomer material is secured within the casing at each extremity thereof, the first cone being disposed at the magnet end portion of the casing below said magnet with its apex extending into the casing in the direction of the magnet, and the second cone being disposed at the opposite end portion of the casing with its apex extending away from the magnet, the apex of each cone being provided with an opening for passage of the thermometer therethrough from the hollow interior of said cone when said thermometer is inserted into said casing.

24. The combination of claim 18, in which said casing is permanently closed at one end thereof, has a cap for closing its other open end, and said magnet is secured within said casing near its open end, whereby the magnetic slug is drawn up to the upper portion of the tube by inserting the lower portion of said thermometer into the magnet end portion of the casing and pushing said thermometer into said casing, and said magnetic slug is thereafter drawn to minimum position by pulling the thermometer out of the casing.

References Cited by the Examiner
UNITED STATES PATENTS 1,595,350   8/1926   McMillon _____ 206—16.6

LOUIS R. PRINCE, *Primary Examiner.*

W. A. HENRY, *Assistant Examiner.*